(12) United States Patent
Yang et al.

(10) Patent No.: US 8,303,157 B2
(45) Date of Patent: Nov. 6, 2012

(54) DISPLAY APPARATUS AND ASSEMBLING METHOD THEREOF

(75) Inventors: Jen-Chih Yang, Miao-Li County (TW); Ta-Chin Huang, Miao-Li County (TW); Chou-Yu Kang, Miao-Li County (TW); Feng-Chan Lin, Miao-Li County (TW); Jaw-Chien Chao, Miao-Li County (TW); Pu-Chun Chu, Miao-Li County (TW)

(73) Assignee: Chimei Innolux Corporation (TW)

( * ) Notice: Subject to any disclaimer, the term of this patent is extended or adjusted under 35 U.S.C. 154(b) by 84 days.

(21) Appl. No.: 13/006,703

(22) Filed: Jan. 14, 2011

(65) Prior Publication Data

US 2011/0176331 A1 Jul. 21, 2011

(30) Foreign Application Priority Data

Jan. 15, 2010 (TW) .............................. 99101110 A

(51) Int. Cl.
*F21V 8/00* (2006.01)

(52) U.S. Cl. ....................................... 362/633; 362/632

(58) Field of Classification Search .................. 362/611, 362/612, 613, 632–634
See application file for complete search history.

(56) References Cited

U.S. PATENT DOCUMENTS

| 2007/0153155 A1* | 7/2007 | Chung et al. ..................... 349/58 |
| 2007/0211191 A1* | 9/2007 | Cho et al. ........................ 349/58 |
| 2008/0151141 A1* | 6/2008 | Huang et al. ................... 349/65 |
| 2010/0073959 A1* | 3/2010 | Hamada ....................... 362/611 |

* cited by examiner

*Primary Examiner* — Laura Tso

(74) *Attorney, Agent, or Firm* — Lowe Hauptman Ham & Berner, LLP

(57) ABSTRACT

A display including a back cover, a front frame, a display panel, a light guide plate, at least one metal bracket and a light emitting element is provided. The front frame is secured to the back cover to form an accommodating space. The display panel and the light guide plate are disposed in the accommodating space. The light guide plate, which has at least one light incident surface and a light exit surface, is configured between the back cover and the display panel. The light exit surface faces toward the display panel. The metal bracket is disposed at side of the accommodating space. The metal bracket has a first part and a second part connected together. The first part is secured to at least the back cover or the front frame. The light emitting element is between the second part and the light incident surface.

11 Claims, 11 Drawing Sheets

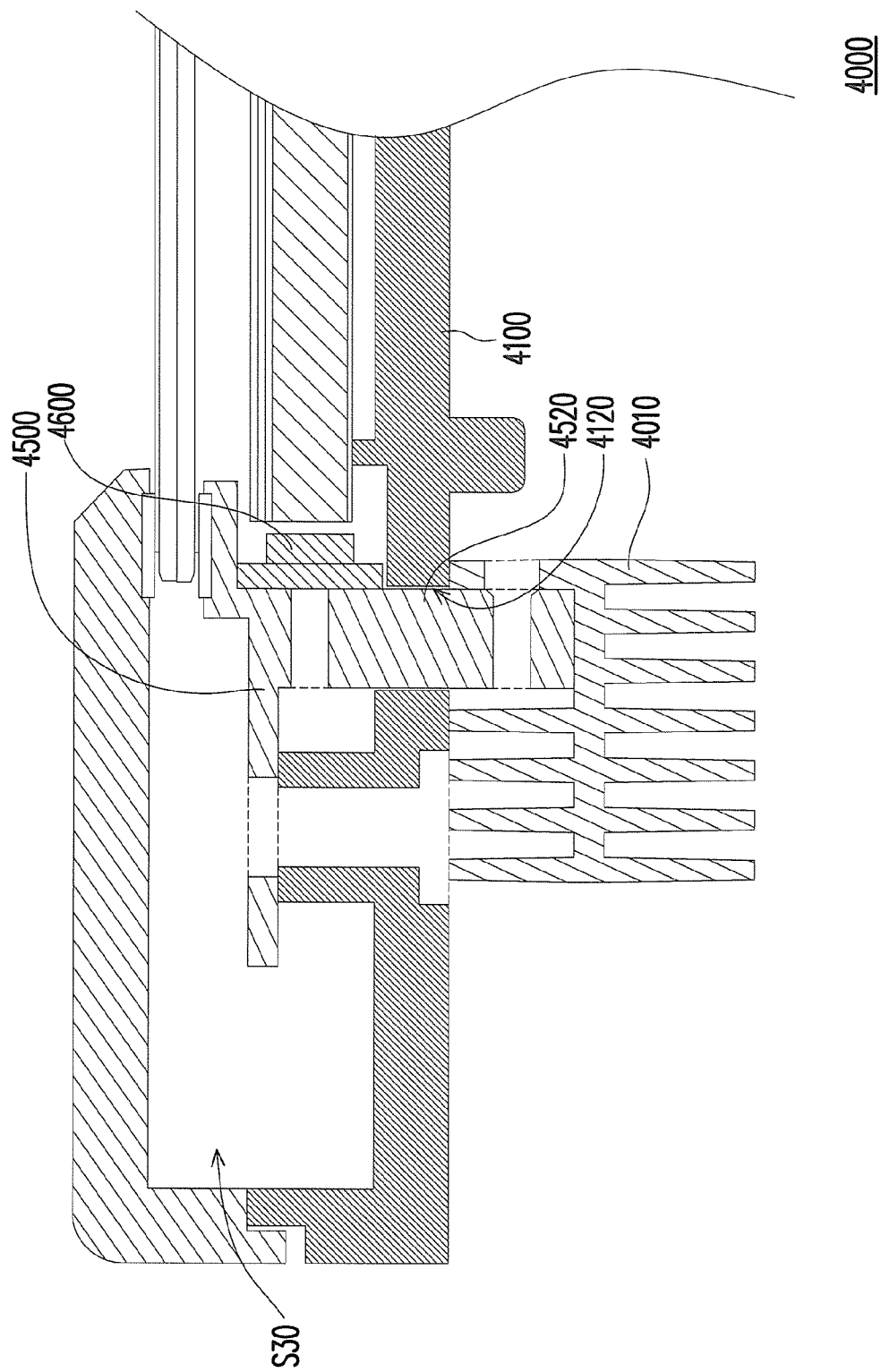

DISPLAY APPARATUS AND ASSEMBLING METHOD THEREOF

CROSS-REFERENCE TO RELATED APPLICATION

This application claims the priority benefit of Taiwan application serial no. 99101110, filed on Jan. 15, 2010. The entirety of the above-mentioned patent application is hereby incorporated by reference herein and made a part of specification.

BACKGROUND

1. Field of the Invention

The present invention relates to a display apparatus and an assembling method thereof, and more particularly to a light and compact display apparatus and an assembling method thereof.

2. Description of Related Art

With the progress in technologies, image devices have become indispensable in people's daily lives. Flat panel displays (FPD) have such superior characteristics such as light and compact, and low power consumption, that FPDs have gradually replaced conventional cathode ray tube (CRT) displays in recent years.

FIG. 1 is an explosive view diagram of a conventional liquid crystal display apparatus. Referring to FIG. 1, a conventional liquid crystal display apparatus 100 may roughly divided into an external front frame 110, an external back cover 120, a liquid crystal module 130 and a stand 140. FIG. 2 is an explosive view diagram of the liquid crystal module of the liquid crystal display apparatus in FIG. 1. Referring to FIG. 2, the liquid crystal module 130 is roughly divided into a front frame 132, a liquid crystal panel 134 and a backlight module 136. FIG. 3 is a partial cross-sectional view of the liquid crystal display apparatus in FIG. 1. According to FIG. 3, the external back cover 120 and the back plate 136a of the backlight module 136 provide a redundant function of protecting the backlight module 136. The external front frame 110 and the front frame 132 also provide the redundant function of protecting the liquid crystal panel 134. Further, the external front frame 110, the front frame 136, and the plastic frame 136b of the back light model provide the redundant function of securing the liquid crystal panel 134 and the light guide plate 136c of the backlight module 136 to the back plate 136a. These components with redundant functions, not only increases the overall weight and volume of the liquid crystal display apparatus 100, it also increases the material and assembling costs of the liquid crystal display apparatus 100. The plastic frame 136b is formed by injection molding of the plastic material and the manufacturing cost of the molds is very high.

SUMMARY OF THE INVENTION

The present invention provides a display apparatus, wherein the problems of overweight, oversize and over cost due to excessive devices can be resolved.

The present invention provides an assembling method of a display apparatus, wherein the problem of over cost can be resolved.

According to an exemplary embodiment of the invention, the display apparatus includes a back cover, a front frame, a display panel, at least a first metal bracket, and a light emitting device. The front frame is secured to the back cover, and together they form an accommodating space. The display panel is disposed in the accommodating space. The light guide plate is disposed in the accommodating space between the back cover and the display panel. The light guide plate includes at least a light incident surface and a light exit surface that is substantially vertical to the light incident surface, and the light exit surface faces toward the display panel. The first metal bracket is disposed at a periphery of the accommodating space and is proximal to the light guide plate. The first metal bracket includes a first part and a second part connecting with the first part. The first part is secured to at least one of the back cover and the front frame. The light emitting device is disposed between the second part and the light incident surface.

According to an exemplary embodiment of the invention, the first metal bracket further includes a third part. The third part is connected to the second part and is disposed between the display panel and the light guide plate. Further, the display apparatus includes a plurality of cushioning devices, disposed between the third part and the display panel, and between the display panel and the front frame. Moreover, the third part and the front frame respectively include a slot, wherein a portion of the cushioning devices is configured in the slots. Furthermore, the display apparatus further includes at least an optical film, disposed between the display panel and the light guide plate. The third part is configured between the display panel and the optical film, and has a protrusion. The protrusion limits the movement of the optical film on the light guide plate.

According to an exemplary embodiment of the invention, the display apparatus further includes an optical film, disposed between the display panel and the light guide plate.

According to an exemplary embodiment of the invention, the first metal bracket further comprises a third part, and the third part is connected to the second part and is configure between the back cover and the light guide plate.

According to an exemplary embodiment of the invention, the light emitting device further comprises a circuit board and a plurality of light emitting diodes. The circuit board is disposed at the second part. The light emitting diodes are disposed on the circuit board and are electrically connected with the circuit board. Further, the light emitting diodes are configured between the circuit board and the light incident surface.

According to an exemplary embodiment of the invention, the display apparatus further includes a cushioning device, disposed between the display panel and the light guide plate.

According to an exemplary embodiment of the display apparatus of the invention, the display apparatus further comprises a driving circuit board and a flexible circuit board. The driving circuit board is secured to the front frame, and the driving circuit board is connected to the display panel through the flexible circuit board.

According to an exemplary embodiment of the invention, the back cover has an opening, and the second part of the first metal bracket passes through the opening.

According to an exemplary embodiment of the display apparatus of the invention, the display apparatus further includes a heat sink, and the second part of the first metal bracket passes through the opening and connects with the heat sink.

According to an exemplary embodiment of the display apparatus of the invention, the display apparatus further includes a plurality of second metal brackets, disposed at a periphery of the accommodating space not occupied by the first metal bracket, and is secured to at least one of the back cover and the front frame. Further, the second metal bracket is an aluminum extruded type of metal bracket, for example.

According to an exemplary embodiment of the display apparatus of the invention, the display apparatus, the first metal bracket is an aluminum extruded type of metal bracket, for example.

An assembling method of a display apparatus according to an exemplary embodiment of the invention includes at least the following process steps of disposing a light emitting device at a metal bracket; disposing the metal bracket having the light emitting device, a light guide plate, and a display panel between a back cover and a front frame; integrating the metal bracket, the front frame, and the back cover together. The light guide plate is configured between the back cover and the display panel. Further, light guide plate includes at least a light incident surface and a light exit surface that is substantially vertical to the light incident surface. The light emitting device is configured between the metal bracket and the light incident surface, and the light exit surface faces toward the display panel.

According to the assembling method of a display apparatus of an exemplary embodiment of the invention, after disposing the light guide plate on the back cover, the display panel is disposed on the light guide plate. Further, after the light guide plate, the display panel and the metal bracket with the light emitting device are disposed on the back cover, the front frame is united with the back cover. Moreover, the metal bracket includes a first part, a second part, and a third part, and the light emitting device is disposed at the second part. Further, the first part is secured to at least one of the back cover and the front frame. After the light guide plate is disposed on the back cover, the metal bracket with the light emitting device is disposed on the back cover, and the third part covers a periphery of the light guide plate. After the metal bracket with the light emitting device is disposed on the back cover, the display panel is disposed on the third part. After the display panel is disposed on the third part, the front frame is combined with the back cover.

According to the assembling method of a display apparatus of an exemplary embodiment of the invention, after the display panel is disposed on the front frame, the light guide plate is disposed on the display panel. After the light guide plate, the display panel, and the metal bracket with the light emitting device are disposed on the back cover, the front cover is united with the back cover. Moreover, the metal bracket includes a first part, a second part, and a third part. The light emitting device is disposed at the second part, and the first part is secured to at least one of the back cover and the front frame. After the display panel is disposed on the front frame, the metal bracket with the light emitting device is disposed on the front frame, and the third part covers a periphery of the display panel. After the metal bracket with the light emitting device is disposed on the front frame, the light guide plate is disposed on the third part. After the light guide plate is placed on the third part, the back cover is united with the front frame.

According to the display apparatus and the assembling method thereof of the exemplary embodiments of the invention, since the number of devices is greatly reduced, the overall thickness, weight and cost of the display apparatus are correspondingly reduced. Further, the assembling process of the display apparatus is simplified.

In order to the make the aforementioned and other objects, features and advantages of the present invention comprehensible, a preferred embodiment accompanied with figures are described in detail below.

BRIEF DESCRIPTION OF THE DRAWINGS

FIG. 11 is a partial cross-sectional view diagram of the liquid crystal display apparatus according to yet another exemplary embodiment of the invention.

DESCRIPTION OF EMBODIMENTS

Figure 1:
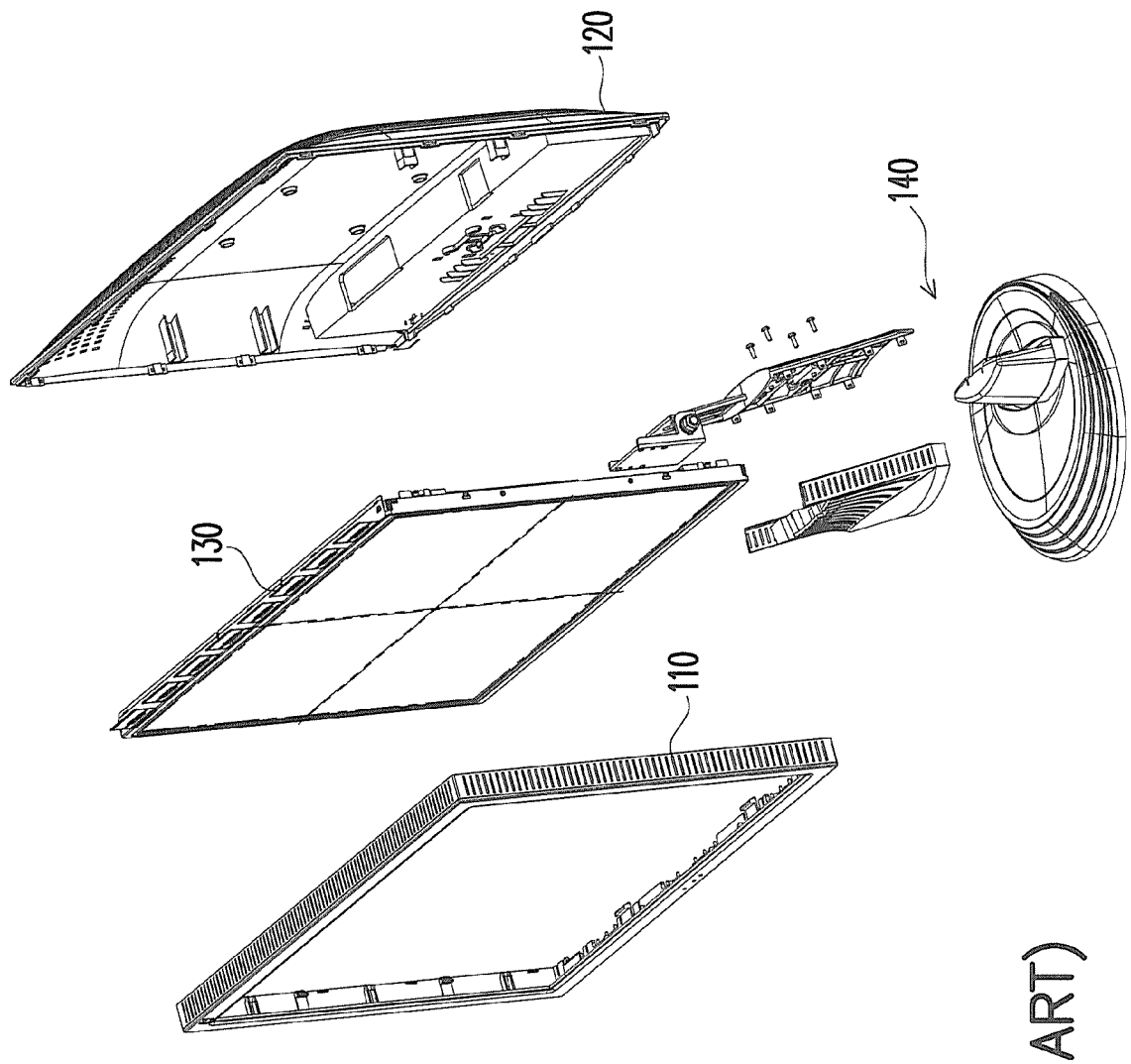
FIG. 1 is an explosive view diagram of a conventional liquid crystal display apparatus.
Figure 2:
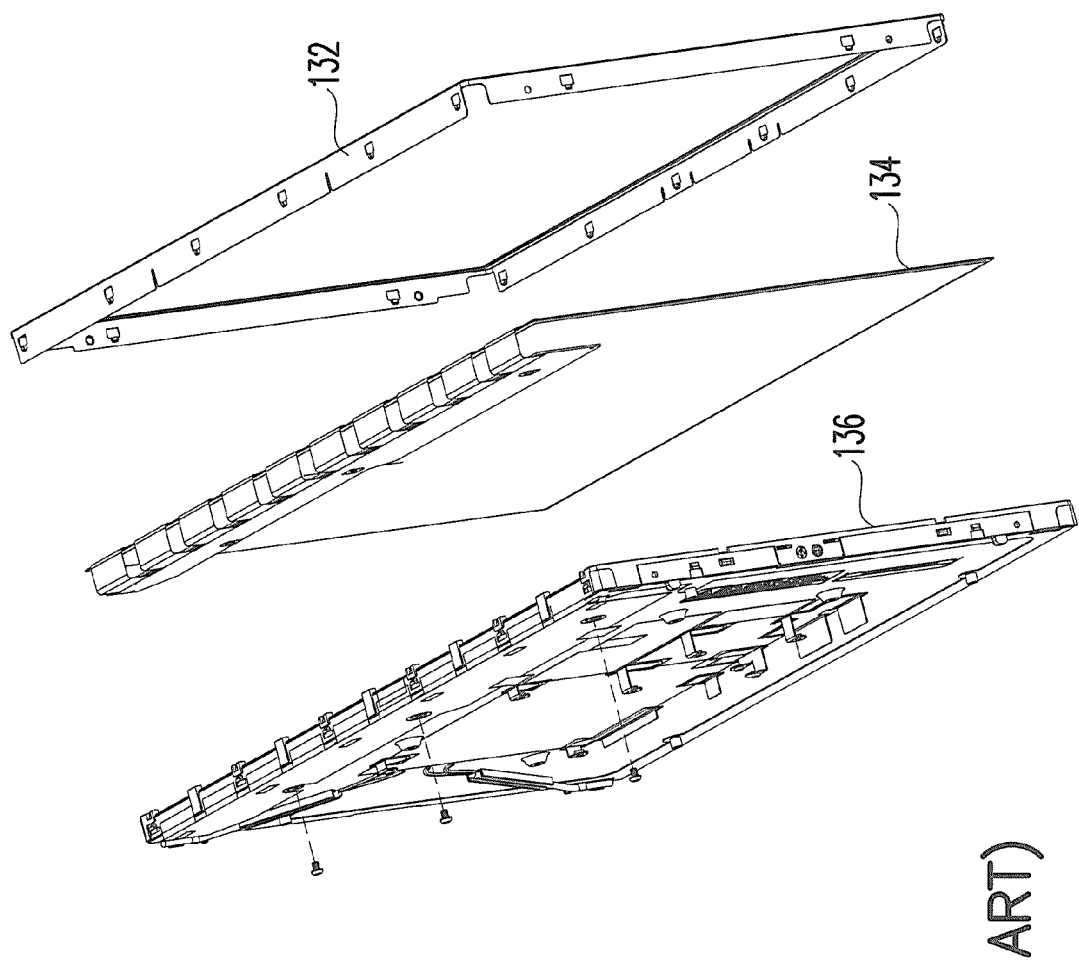
FIG. 2 is an explosive view diagram of a liquid crystal module of the liquid crystal display apparatus in FIG. 1.
Figure 3:
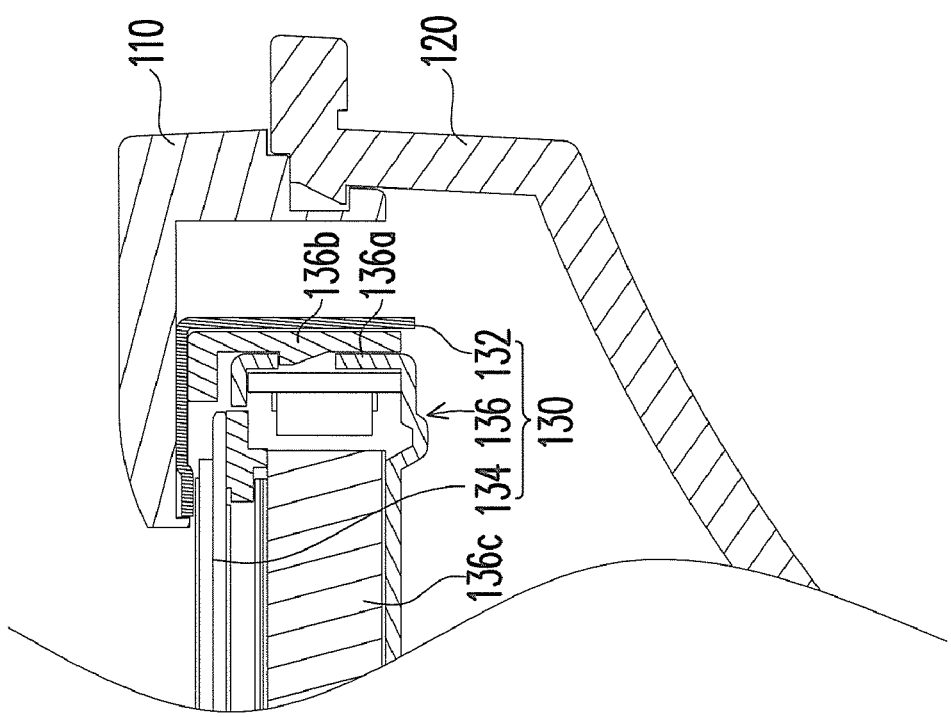
FIG. 3 is a partial sectional view of the liquid crystal display apparatus in FIG. 1.
Figure 4:
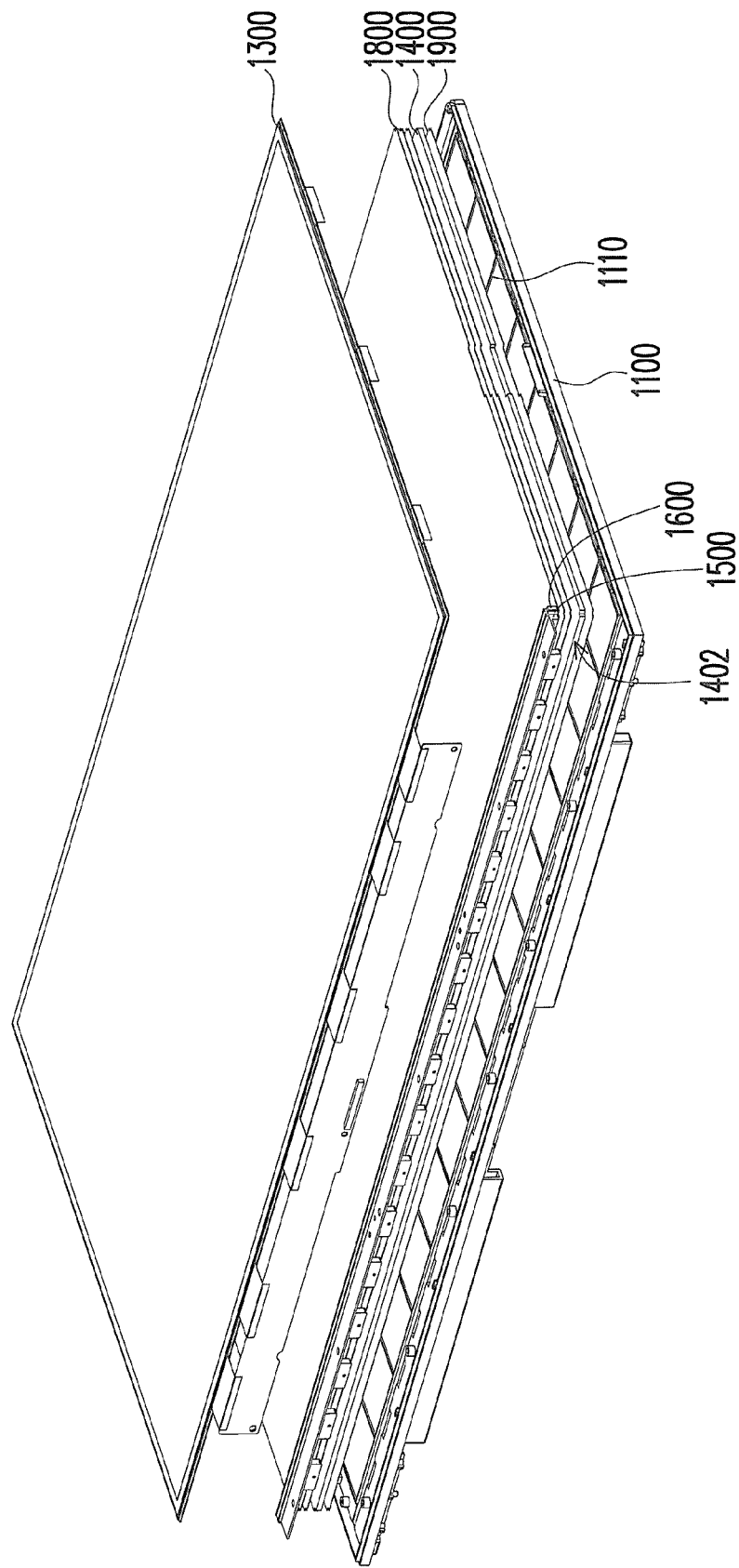
FIG. 4 is an explosive view diagram of a liquid crystal display apparatus according to an exemplary embodiment of the invention.
Figure 5:
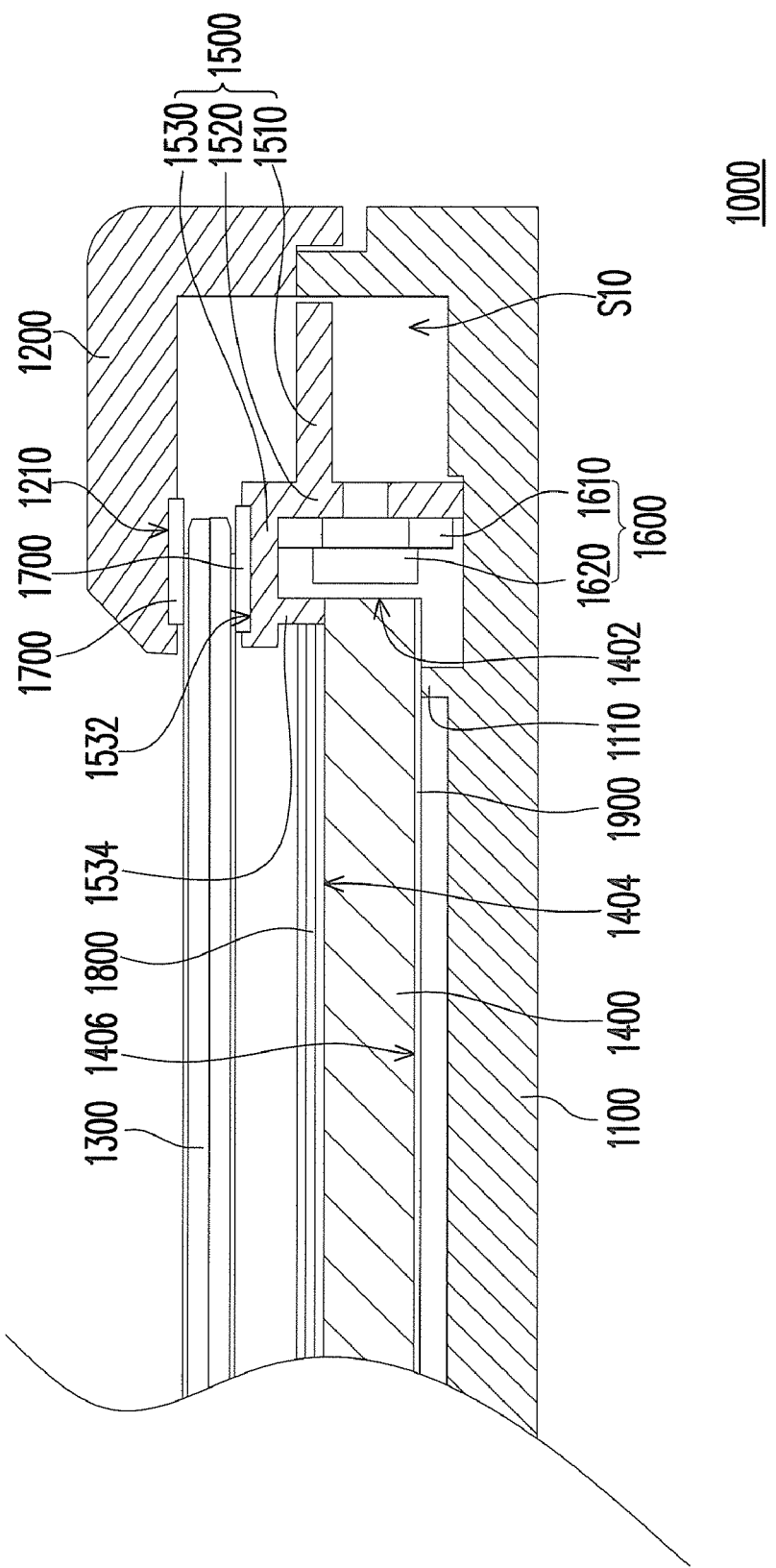
FIG. 5 is a partial sectional view diagram of the liquid crystal display apparatus in FIG. 4.

FIG. 4 is an explosive view diagram of a liquid crystal display apparatus according to an exemplary embodiment of the invention. FIG. 5 is a partial, cross-sectional view diagram of the liquid crystal display apparatus in FIG. 4. Referring to FIGS. 4 and 5, the display apparatus 1000 of this exemplary embodiment includes a back cover 1100, a front frame 1200 (this device is omitted in FIG. 4), a display panel 1300, a light guide plate 1400, at least one first metal bracket 1500 and a light emitting device 1600. The front frame 1200 is secured to the back cover 1100, and together they form an accommodating space S10. The display panel 1300 is disposed in the accommodating space S10. The light guide plate 1400 is disposed in the accommodating space S10, between the back cover 1100 and the display panel 1300. In other words, the display panel 1300 and the light guide plate 1400 are sandwiched and secured by the front frame 1200 and the back cover 1100.

The light guide plate 1400 includes at least a light incident surface 1402 and a light exit surface 1404 that are substantially vertical to each other, and the light exit surface 1404 faces toward the display panel 1300. Although the certain illustrated embodiments herein refers the to the light guide plate 1400 with a single light incident surface 1402, it is to be understood that these embodiments are presented by way of example and not by way of limitation. The number of the light incident surface 1402 could be two or more. The first metal bracket 1500 is disposed at the periphery of the accommodating space S10, proximal to the light guide plate 1400. The first metal bracket 1500 includes the mutually connected first part 1510 and the second part 1520, and the first part 1510 is secured to at least one of the back cover 1100 and the front frame 1200. The light emitting device 1600 is disposed between the second part 1520 and the light incident surface 1402. As the number of the light incident surface 1402 increases, the number of the first metal bracket 1500 used in securing the light emitting device 1600 correspondingly increases.

Accordingly, the back cover 1100 of the display apparatus 1000 simultaneously functions as an external back cover and a back plate of the backlight module of a conventional display apparatus. Alternatively speaking, the back cover 1100 of the display apparatus 1000 of the invention provides the protection of the light guide panel 1400 and the support of the entire display apparatus 1000. Concurrently, the front frame 1200 simultaneously functions as the external front frame, the plastic frame, and the front frame of the liquid crystal module of the conventional display apparatus. In other words, the display panel 1300 and the light guide plate 1400 are secured to the back cover 1100. Hence, the volume and the weight of the display apparatus in the exemplary embodiment of the invention can be reduced significantly. Moreover, the material and assembling costs can be notably reduced. Additionally, the first metal bracket 1500 not only secures the light emitting device 1600, it also assists in the heat dissipation of the light emitting device 1600 and enhances the rigidity of the display apparatus 1000.

The first metal bracket 1500 of this exemplary embodiment of the disclosure is, for example, an aluminum extruded type of metal bracket. The application of complicated molds formed by the injection molding technique, the complicated mold assembly, mold alignment and the mold stripping process are precluded in the aluminum extrusion fabrication technique. Consequently, the fabrication cost is substantially lower than the cost of injection molding used in the fabrication of a plastic frame. The aluminum material of the first metal bracket 1500 provides the desirable characteristics, such as lightweight, high rigidity, and fast thermal conductivity. The first metal bracket 1500 may be secured only to the back cover 1100, only to the front frame 1200, or simultaneously to the back cover 1100 and the front frame 1200. When the first metal bracket 1500 requires screw holes or other structures that can not be formed during the aluminum extrusion process, simple hole punching or other processing techniques can be applied instead. Further, the certain illustrated embodiments herein refers to the first part 1510 of the first metal bracket 1500 being configured between the back cover 1100 and the front frame 1200, it is to be understood that the first part 1510 may also be configured near the back cover 1100 or the front frame 1200.

The first metal bracket 1500 of this exemplary embodiment further includes a third part 1530. The third part 1530 is connected to the second part 1520 and is configured between the display panel 1300 and the light guide plate 1400. Hence, the third part 1530 and the front frame 1200 together sandwich and secure the display panel 1300, and the third part 1530 and the back cover 1100 together sandwich and secure the light guide plate 1400. Since the third part 1530 is positioned between the display panel 1300 and the light guide plate 1400, the third part 1530 may also used to shield the light emitting device 1600 to prevent the user to see the abnormal high brightness region near the light emitting device 1600. It is worthy to note that the first metal bracket 1500 may not include the third part 1530. Moreover, the function of the third part 1530 could be provided by another independent device, which will be introduced in other exemplary embodiments.

Further, the display apparatus 1000 of this exemplary embodiment further includes a plurality of cushioning devices 1700, disposed between the third part 1530 and the display panel 1300, and between the display panel 1300 and the front frame 1200. With the cushioning devices 1700, any abrasion of the display panel 1300 by the third part 1530 of the first metal bracket 1500 or the front frame 1200 could be prevented. The material of the cushioning devices 1700 includes, for example, rubber, sponge or other cushioning materials. Further, the third part 1530 of this exemplary embodiment further includes a slot 1532 and the front frame 1200 also includes a slot 1210. The two cushioning devices 1700 are respectively disposed in the slot 1532 and the slot 1210. The slots 1532 and 1210 provide the appropriate positioning effect for the two cushioning devices 1700 to prevent the cushioning devices 1700 from shifting in positions.

Furthermore, the display apparatus 1000 of this exemplary embodiment includes at least an optical film 1800, disposed between the display panel 1300 and the light guide plate 1400. Although the certain illustrated embodiments herein refer a plurality of optical films, it is to be understood that the number of optical films in these embodiments are presented by way of example and not by way of limitation. Moreover, the thermal expansion coefficients of the optical films 1800 and the light guide plate 1400 are usually different. To respectively provide appropriate positioning effect for the optical films 1800 and the light guide plate 1400, the third part 1530 configured between the display panel 1300 and the optical films 1800 includes a protrusion 1534, wherein the protrusion 1534 limits the optical films 1800 to move on the light guide plate 1400.

The display apparatus 1000 of this exemplary embodiment further includes a reflector sheet 1900, disposed between the light guide plate 1400 and the back cover 1100 for improving the light utilization efficiency of the display apparatus 1000. However, forming a reflective material layer at the bottom surface 1406 of the light guide plate 1400 or on the surface of the back cover 1100 facing the light guide plate 1400 may also increase the light utilization efficiency of the display apparatus 1000. Further, the back cover 1100 may form with net shape or other pattern support ribs 1110, in which the rigidity of the back cover 1100 structure is enhanced and the contact area between the light guide plate 1400 and the back cover 1100 is reduced. The light emitting device 1600 in the exemplary embodiment of the invention includes a circuit board 1610 and a plurality of light emitting diodes 1620 (only one light emitting diode 1620 is illustrated in FIG. 5). The circuit board 1610 is disposed at the second part 1520. The light emitting diodes 1620 are disposed on the circuit board 1610 and are electrically connected with the circuit board 1610, and are configured between the circuit board 1610 and the light incident surface 1402. It should be appreciated that the light emitting device 1600 of the invention may employ a cold cathode ray fluorescent lamp or other light emitting devices. The display panel in this exemplary embodiment may be a liquid crystal panel or other types of display panel.

Referring to FIG. 5, wherein FIG. 5 illustrates to the assembling method of a liquid crystal display apparatus according to an exemplary embodiment of the invention. The assembling method of a liquid crystal display apparatus of an exemplary embodiment of the invention includes disposing the light emitting device 1600 at the first metal bracket 1500. Thereafter, the first metal bracket 1500 with the light emitting device 1600, the light guide plate 1400, and the display panel 1300 are disposed between the back cover 1100 and the front frame 1200. Then, the first metal bracket 1500, the front frame 1200 and the back cover 1100 are united together to complete the assembling of the liquid crystal display apparatus of an exemplary embodiment of the invention. The method of uniting the metal bracket 1500, the front frame 1200 and the back cover 110 includes the application of screws, glue, rivet bonding, wedge bonding, or other appropriate bonding methods. The first metal bracket 1500 is first united with the front frame 1200, and the back cover 1100 is united with the front frame 1200. Alternatively, the first metal bracket 1500 is united with the back cover 1100, and the front frame 1200 is then united with the back cover 1100. Another option, the first metal bracket 1500, the front frame 1200, and the back cover 1100 are combined together simultaneously.

For example, the light guide plate 1400 may be disposed on the back cover 1100 first, followed by disposing the display panel 1300 on the light guide plate 1400. Further, after disposing the light guide plate 1400, the display panel 1300, the first metal bracket 1500 and the light emitting device 1600 on the back cover 1100, the front frame 1200 is united with the back cover 1100. When the first metal bracket 1500 includes the first part 1510, the second part 1520 and the third part 1530 which are connected together, the light emitting device 1600 is first disposed at the second part 1520. Then, the light guide plate 1400 is disposed on the back cover 1100. Thereafter, the first metal bracket 1500 is disposed on the back cover 1100, and the third part 1530 covers the periphery of the light guide plate 1400. The display panel 1300 is then disposed on the third part 1530. Ultimately, the front frame 1200 is combined with the back cover 1100, and the first part 1510 of the metal bracket 1500 is secured to the back cover 1100 and/or the front frame 1200. According to this assembling method of the display apparatus 1000, the back cover 1100 is placed on a work station and the other devices are sequentially placed on the back cover 1100. Hence, during the assembling process, it is not necessary to turn the devices over and one-way assembly is achieved. Hence, not only the assembling steps are substantially simplified, the assembling process is far less complicated. More particularly, for a large dimension display apparatus, it is difficult and time consuming to turn the devices over during the assembling process.

According to another exemplary embodiment, the display panel 1300 is first disposed on the front frame 1200, followed by disposing the light guide plate 1400 on the display panel 1300. After disposing the light guide plate 1400, the display panel 1300, the first metal bracket 1500, and the light emitting device 1600 on the back cover 1100, the back cover 1100 is united with the front frame 1200. When the first metal bracket 1500 includes the first part 1510, the second part 1520, and the third part 1530 that are connected together, the light emitting device 1600 is disposed at the second part 1520. Then, the display panel 1300 is disposed on the front frame 1200. Thereafter, the first metal bracket 1500 is disposed on the front frame 1200, while the third part 1530 covers the periphery of the display panel 1300. The light guide plate 1400 is further disposed on the third part 1530. Ultimately, the back cover 1100 is united with the front frame 1200, and the first part 1510 of the first metal bracket 1500 is secured to the back cover 1100 and/or the front frame 1200. According to the assembling method, after placing the front frame 1200 on the work station, other devices are sequentially placed on the front frame 1200. Similarly, in this assembling process, it is unnecessary to turn the devices over and one-way assembly is achieved.

Figure 6:
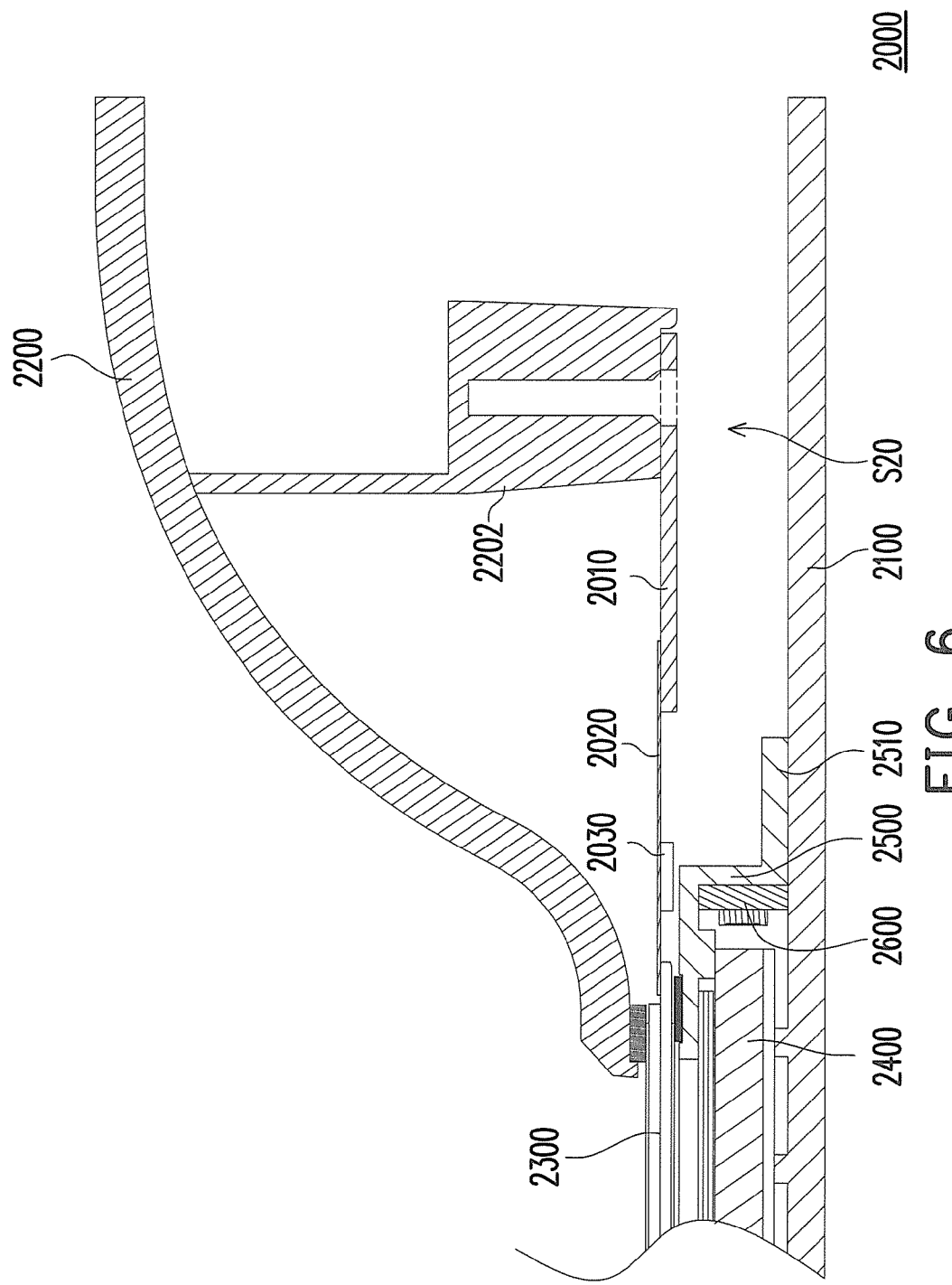
FIG. 6 is a partial sectional view diagram of the liquid crystal display apparatus according to another exemplary embodiment of the invention.
Figure 7:
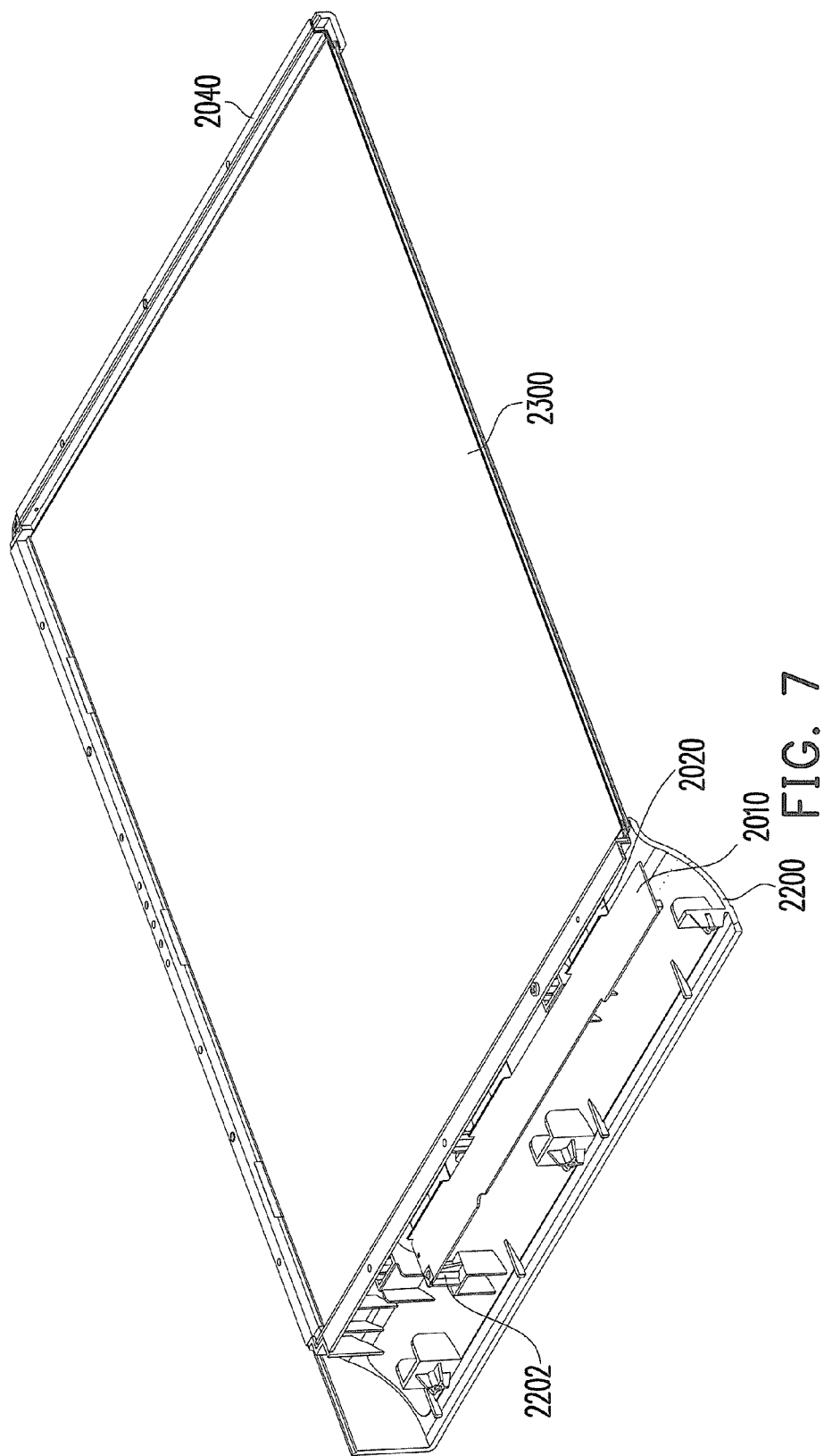
FIG. 7 is a perspective view diagram of the display apparatus in FIG. 6.

FIG. 6 is a partial cross-sectional view of a liquid crystal display apparatus according to another exemplary embodiment, while FIG. 7 is a perspective cross-sectional view of the display apparatus in FIG. 6. Referring to FIGS. 6 and 7, the display apparatus 2000 is this exemplary embodiment is substantially the same as the display apparatus in FIG. 5. The differences between the two display apparatus lie in that the display apparatus 2000 in this exemplary embodiment further includes a driving circuit board 2010 and a flexible circuit board 2020. The driving circuit board 2010 is secured to the front frame 2200, and the driving circuit board 2010 is electrically connected to the display panel 2300 through the flexible circuit board 2020. Further, the flexible circuit board 2020 may also include driver chips 2030 thereon. The driving circuit board 2010, for example, is locked to a post 2202 of the front frame 2200. The first metal bracket 2500 in this exemplary embodiment is similar to the first metal bracket 1500 in FIG. 5; a difference between the two metal brackets is that the first part 2510 of the first metal bracket 2500 is in the proximity of the back cover 2100.

Figure 8:
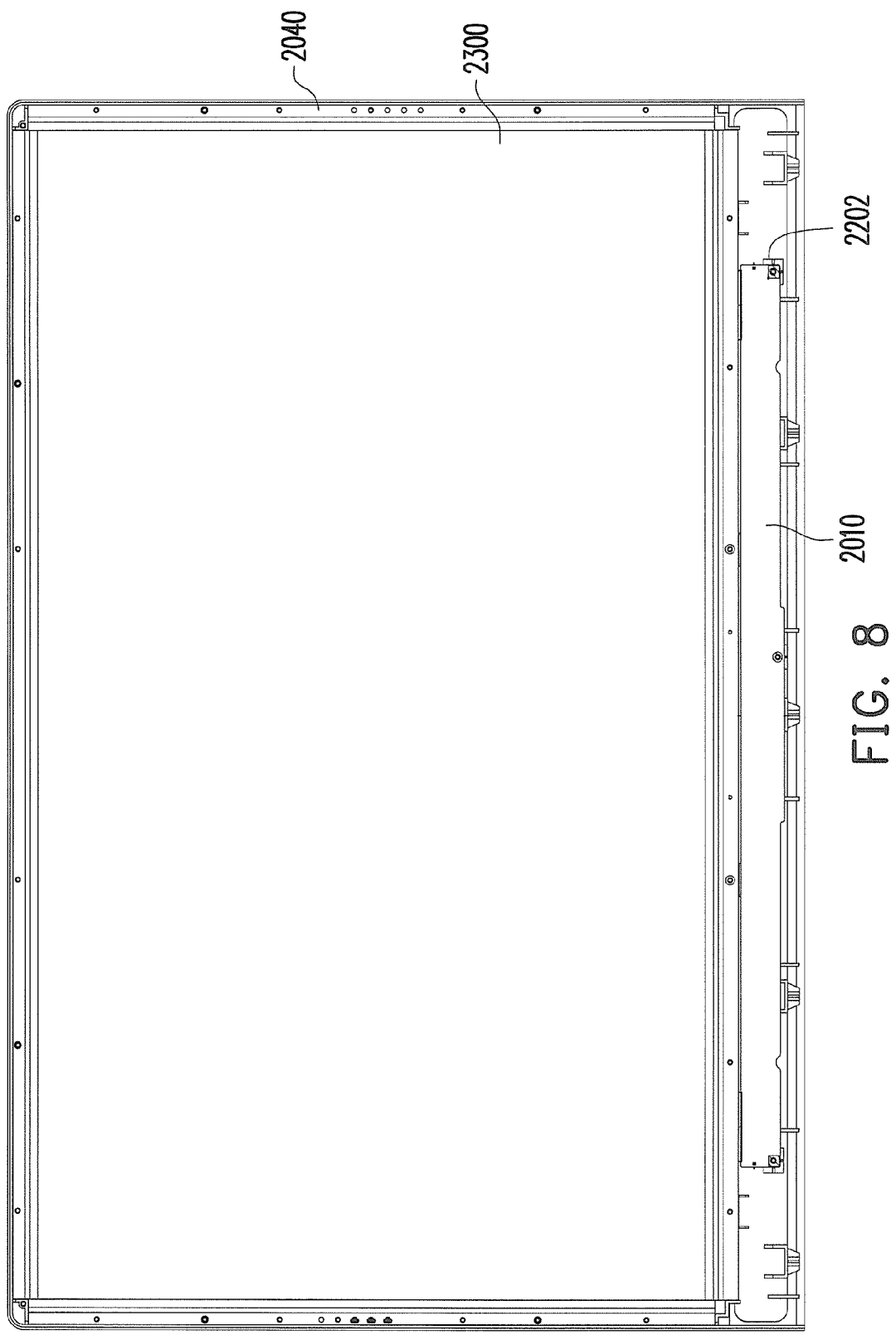
FIG. 8 is a front view diagram of the display apparatus in FIG. 6.
Figure 9:
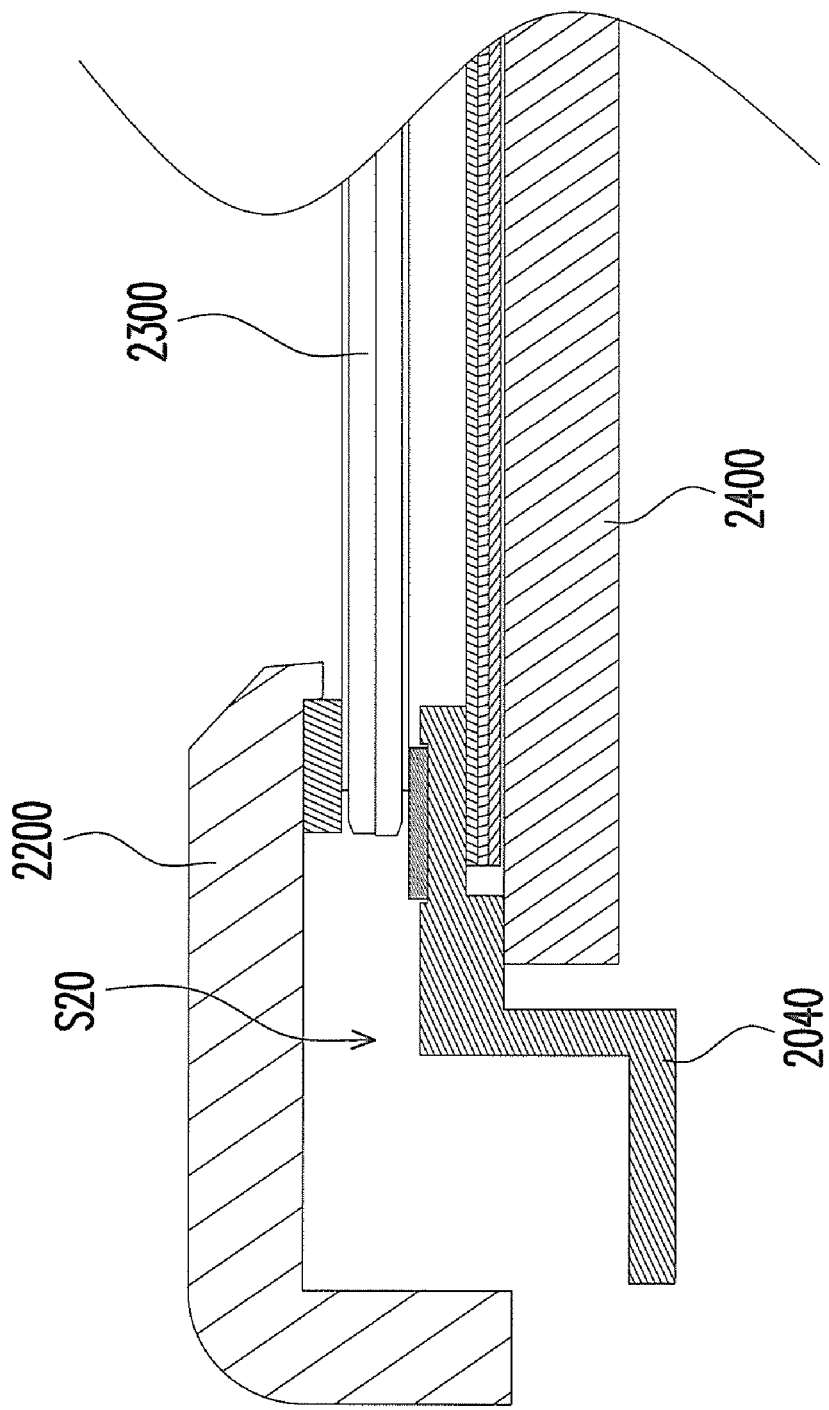
FIG. 9 is a partial cross-sectional view diagram of the display apparatus in FIG. 6 at a second metal bracket.

FIG. 8 is the front view of the display apparatus in FIG. 6, while FIG. 9 is a partial cross-sectional view of the display apparatus in FIG. 6 configured at a second metal bracket. For the sake of simplicity, the back cover 2100 in FIG. 6 is omitted in FIGS. 7, 8 and 9. Referring to FIGS. 6, 8 and 9, the display apparatus 2000 in this exemplary embodiment further includes a plurality of second metal brackets 2040, disposed at the periphery of the accommodating space S20 that is not occupied by the first metal bracket 2500, and is secured to the back cover 2100 and/or the front frame 2200. The second metal bracket 2040 and the first metal bracket 2500 both strengthen the rigidity of the display apparatus 2000 and serve to separate the liquid crystal panel 2300 and the light guide plate 2400. However, the second metal bracket 2040 is not used to secure the light emitting device 2600. The second metal bracket 2040 and the first metal bracket 2500 can both be an aluminum extruded type of metal bracket, which has the desirable characteristics, such as low cost, light, high rigidity, and fast thermal conductivity.

Figure 10:
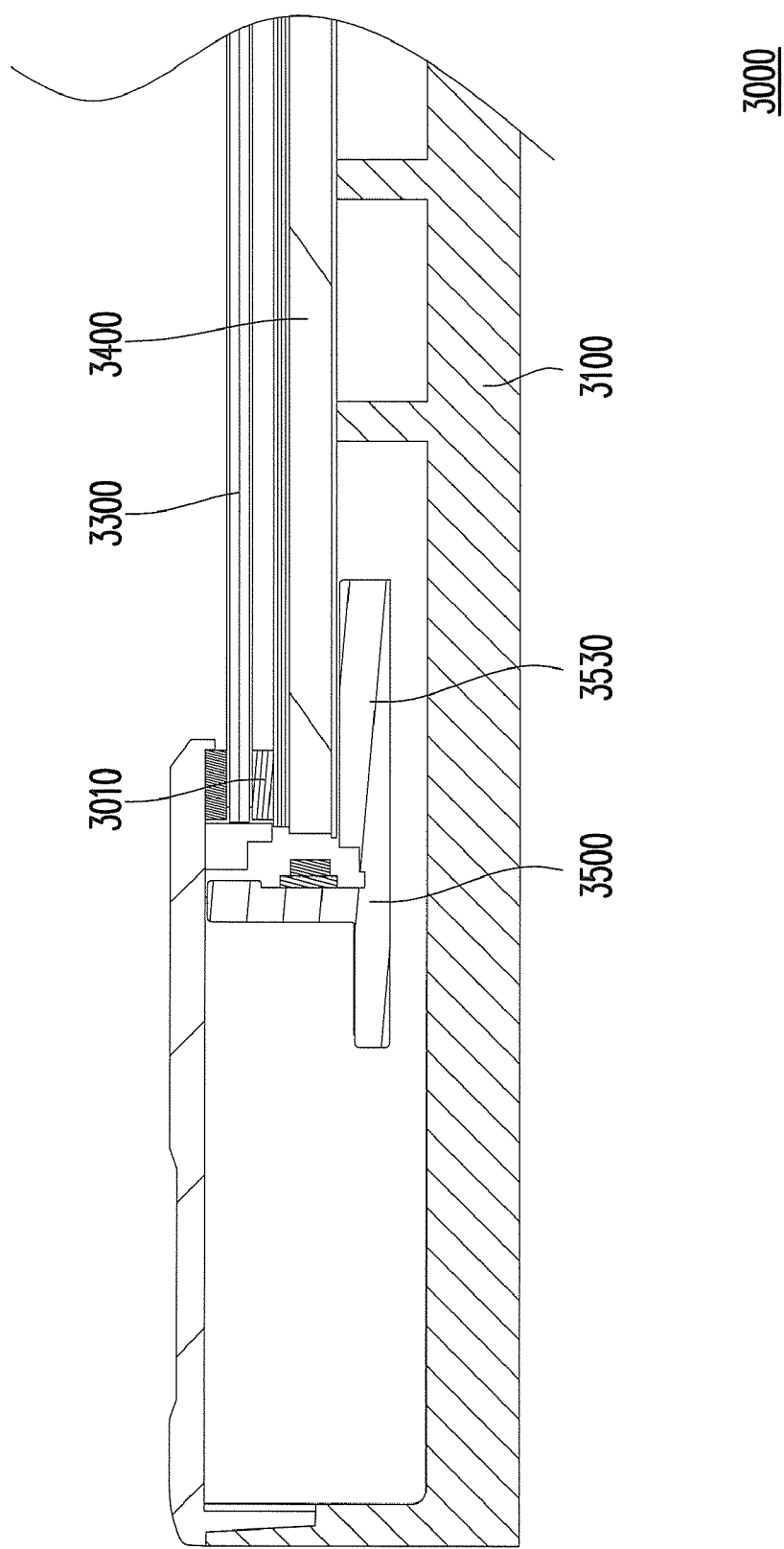
FIG. 10 is a partial cross-sectional view diagram of the liquid crystal display apparatus according to another exemplary embodiment of the invention.

FIG. 10 is a partial cross-sectional view diagram of the liquid crystal display apparatus according to another exemplary embodiment of the invention. Referring to FIG. 10, the display apparatus 3000 is this exemplary embodiment is substantially the same as the display apparatus 1000 in FIG. 5. The difference between the two display apparatus lies in the display apparatus 3000 in this exemplary embodiment further comprising a cushioning device 3010, disposed between the display panel 3300 and the light guide plate 3400. The function of the cushioning device 3010 is similar to that at the third part 1530 of the first metal bracket 1500 in FIG. 5, wherein the third part 3530 of the first metal bracket 3500 of this exemplary embodiment is disposed between the back cover 3100 and the light guide plate 3400. The function of the third part 3530 of the first metal bracket 3500 provides a greater thermal dissipation area to enhance the thermal dissipation efficiency of the display apparatus 3000. The material of the cushioning device 3010 includes, but not limited to, rubber, sponge or other cushioning materials.

FIG. 11 is a partial sectional view diagram of the liquid crystal display apparatus according to another exemplary embodiment of the invention. Referring to FIG. 11, the display apparatus 4000 is this exemplary embodiment is substantially the same as the display apparatus 1000 in FIG. 5. The difference between the two display apparatus lies in the display apparatus 4000 in this exemplary embodiment further comprising a heat sink 4010. The back cover 4100 has an opening 4120, and the second part 4520 of the first metal bracket 4500 passes through the opening 4120 to connect with the heat sink 4010. Alternatively speaking, the heat sink 4010 is configured outside the accommodating space S30 formed by the back cover 4100 and the front frame 4200. Since the heat sink 4010 is exposed to the exterior, the heat generated by the light emitting device 4600 is transmitted to the heat sink 4010 through the first metal bracket 4500 and is rapidly dissipated. The heat sink 4010 in this exemplary embodiment is locked to the second part 4520 of the first metal bracket 4500; alternatively, these devices could be united together by other means. However, if desirable thermal dissipation effect can be achieved by passing the second part 4520 of the first metal bracket 4500 through the opening 4120, incorporating a heat sink to the second part 4520 of the first metal bracket 4500 can be precluded.

According to the display apparatus of the exemplary embodiments of the invention, the number of devices greatly reduced to significantly reduce the overall thickness and weight of the display apparatus; hence, the material and manufacturing costs are also reduced. Additionally, the metal bracket not only enhances the thermal dissipation effect, it also assists in maintaining the structural rigidly of the display apparatus. In the assembling method of a display apparatus of the exemplary embodiments of the invention, since the number of devices is reduced, the hours required in assembling the display apparatus is correspondingly reduced. Further, the assembling method of the display apparatus in the exemplary embodiments of the disclosure can be one-way assembly, which further reduces the manufacturing time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display apparatus, comprising:
   a back cover;
   a front frame, secured to the back cover, wherein the back cover and the front frame together formed an accommodating space;
   a display panel disposed in the accommodating space;
   a light guide plate, disposed in the accommodating space and between the back cover and the display panel, and the light guide pate comprises at least a light incident surface and a light exit surface that are substantially vertical to each other, and the light exit surface facing toward the display panel;
   at least one first metal bracket, disposed at a periphery of the accommodating space and in a proximity of the light guide plate, and the first metal bracket comprising a first part and a second connected together, wherein the first part is secured to at least one of the back cover and the front frame; and
   a light emitting device, disposed between the second part and the light incident surface, wherein the first metal bracket further includes a third part, and the third part is connected with the second part and is configured between the display panel and the light guide plate.

2. The display apparatus of claim 1 further comprising a plurality of cushioning devices, disposed between the third part and the display panel, and between the display panel and the front frame.

3. The display apparatus of claim 2, wherein the third part and the front frame respectively include a slot, and a portion of the cushioning devices are disposed in the slots.

4. The display apparatus of claim 1 further comprising at least an optical film, disposed between the display panel and the light guide plate, wherein the third part is configured between the display panel and the optical film, and the third part comprises a protrusion, and the protrusion limits a movement of the optical film on the light guide plate.

5. The display apparatus of claim 1, wherein the first metal bracket further comprises a third part, and the third part is connected to the second part and is configured between the back cover and the light guide plate.

6. The display apparatus of claim 1, wherein the light emitting device comprises:
   a circuit board, disposed at the second part; and
   a plurality of light emitting diodes, disposed on the circuit board and electrically connected with the circuit board, and is configured between the circuit board and the light incident surface.

7. The display apparatus of claim 1 further comprising a cushioning device, disposed between the display panel and the light guide plate.

8. The display apparatus of claim 1 further comprising a driving circuit board and a flexible circuit board, wherein the driving circuit board is secured to the front frame, and the driving circuit board is electrically connected to the display panel through the flexible circuit board.

9. The display apparatus of claim 1, wherein the back cover comprises an opening, and the second part of the first metal bracket passes through the opening.

10. The display apparatus of claim 1 further comprising a plurality of second metal brackets, disposed at a periphery of the accommodating space not occupied by the first metal bracket, and is secured to at least one of the back cover and the front frame.

11. The display apparatus of claim 1, wherein the first metal bracket comprises an aluminum extruded metal bracket.

* * * * *